(12) United States Patent
Ziemer et al.

(10) Patent No.: US 10,000,115 B2
(45) Date of Patent: Jun. 19, 2018

(54) METHOD OF OPERATING A TRANSMISSION

(71) Applicant: ZF Friedrichshafen AG, Friedrichshafen (DE)

(72) Inventors: Peter Ziemer, Tettnang (DE); Juri Pawlakowitsch, Horgenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 411 days.

(21) Appl. No.: 14/710,008

(22) Filed: May 12, 2015

(65) Prior Publication Data

US 2015/0323067 A1    Nov. 12, 2015

(30) Foreign Application Priority Data

May 12, 2014 (DE) .......................... 10 2014 208 873

(51) Int. Cl.

| | |
|---|---|
| *F16H 61/04* | (2006.01) |
| *B60K 6/365* | (2007.10) |
| *F16H 61/686* | (2006.01) |
| *B60K 6/48* | (2007.10) |
| *B60K 6/547* | (2007.10) |
| *F16H 3/72* | (2006.01) |
| *F16H 3/66* | (2006.01) |

(52) U.S. Cl.
CPC ............. *B60K 6/365* (2013.01); *B60K 6/48* (2013.01); *B60K 6/547* (2013.01); *F16H 61/0403* (2013.01); *F16H 61/686* (2013.01); *B60K 2006/4816* (2013.01); *F16H 3/66* (2013.01); *F16H 3/725* (2013.01);
(Continued)

(58) Field of Classification Search
CPC ..... F16H 2061/0422; F16H 2061/0474; F16H 2200/006; F16H 2200/0065; F16H 2200/0069; F16H 2200/2012; F16H 2200/2015; F16H 2200/2046; F16H 2200/2064; F16H 2200/2094

See application file for complete search history.

(56) References Cited

U.S. PATENT DOCUMENTS 6,811,508 B2 * 11/2004 Tumback ............... B60K 6/445
475/5
8,585,522 B2 * 11/2013 Kaltenbach ........... B60W 10/06
475/218

(Continued)

FOREIGN PATENT DOCUMENTS

DE        198 49 716         5/2000
WO   WO 2013020759 A1 *   2/2013     ............... F16H 3/66

*Primary Examiner* — Derek D Knight
*Assistant Examiner* — David R Morris
(74) *Attorney, Agent, or Firm* — Dority & Manning, P.A.

(57) ABSTRACT

A method for operating a transmission, wherein the transmission is shifted from an original gear to a target gear, the method including: setting one of the shift elements located in a power flow of the transmission essentially load-free by use of an electric motor; opening the shift element essentially load-free in the first step; synchronizing a rotational speed between two shafts of the transmission by the electric motor or by a torque at the transmission input shaft, the two shafts to be connected in the target gear through a shift element not in the power flow of the transmission at the first step; and locking the shift element between the two shafts synchronized in the third step; wherein a change to a transmission ratio between the original gear and the target gear is greater than a change between the original gear and an adjacent gear.

4 Claims, 9 Drawing Sheets

(52) U.S. Cl.
CPC ............... *F16H 2061/0422* (2013.01); *F16H 2061/0474* (2013.01); *F16H 2200/006* (2013.01); *F16H 2200/0065* (2013.01); *F16H 2200/0069* (2013.01); *F16H 2200/2012* (2013.01); *F16H 2200/2015* (2013.01); *F16H 2200/2046* (2013.01); *F16H 2200/2064* (2013.01); *F16H 2200/2094* (2013.01); *Y02T 10/6221* (2013.01); *Y02T 10/6256* (2013.01)

(56) References Cited

U.S. PATENT DOCUMENTS

| | | | |
|---|---|---|---|
| 8,992,362 B2 | 3/2015 | Ziemer et al. | |
| 9,011,284 B2* | 4/2015 | Ziemer | B60K 6/365 |
| | | | 180/65.6 |
| 9,217,503 B2* | 12/2015 | Herbeth | F16H 61/0403 |
| 9,308,808 B2* | 4/2016 | Griesmeier | F16H 3/66 |
| 2003/0166429 A1* | 9/2003 | Tumback | B60K 6/445 |
| | | | 475/5 |
| 2010/0029436 A1* | 2/2010 | Katsuta | B60K 6/36 |
| | | | 477/5 |
| 2011/0093147 A1 | 4/2011 | Kaltenbach et al. | |
| 2011/0143874 A1* | 6/2011 | Tangl | B60W 20/30 |
| | | | 475/5 |
| 2013/0196810 A1* | 8/2013 | Ziemer | B60K 6/365 |
| | | | 475/5 |
| 2014/0182415 A1* | 7/2014 | Griesmeier | B60K 6/365 |
| | | | 74/661 |
| 2016/0333985 A1* | 11/2016 | Ziemer | F16H 3/725 |
| 2016/0368360 A1* | 12/2016 | Ziemer | B60K 6/445 |
| 2017/0144527 A1* | 5/2017 | Ziemer | B60K 6/365 |

\* cited by examiner

| Gear | C | B | D | E | A | F | Ratio | Ratio Steps |
|------|---|---|---|---|---|---|-------|-------------|
| 1VM  |   | ● |   |   |   | ● | 6.51  |             |
| 2VM  |   |   | ● |   |   | ● | 3.97  | 1.64        |
| 3VM  |   | ● | ● |   |   |   | 2.55  | 1.56        |
| 4VM  |   |   | ● |   | ● |   | 1.64  | 1.55        |
| 5VM  |   | ● |   |   | ● |   | 1.31  | 1.25        |
| 6VM  |   |   |   | ● | ● |   | 1.00  | 1.31        |
| 7VM  |   | ● |   | ● |   |   | 0.75  | 1.34        |
| 8VM  | ● |   |   | ● |   |   | 0.64  | 1.16        |
|      |   |   |   |   |   |   |       | Spread : 10.1 |

Fig. 3

| Gear | C | B | D | E | A | F | Ratio | Ratio Steps |
|---|---|---|---|---|---|---|---|---|
| 1VM2 | | ● | | | | ● | 7.01 | 1.69 |
| 2VM2 | | | | | | ● | 4.14 | 1.63 |
| 3VM2 | | ● | ● | | | | 2.55 | 1.56 |
| 4VM2 | ● | | ● | | | | 1.64 | 1.03 |
| 5VM2 | | | ● | | | | 1.60 | 1.02 |
| 6VM2 | ● | | | | ● | | 1.57 | 1.22 |
| 7VM2 | | ● | | | ● | | 1.28 | 1.28 |
| 8VM2 | | | | ● | ● | | 1.00 | 1.34 |
| 9VM2 | | ● | | ● | | | 0.75 | 1.16 |
| 10VM2 | ● | | | ● | | | 0.64 | |
| | | | | | | | | Spread : 10.9 |

Fig. 5

| Gear | C2 | D2 | B2 | E2 | F2 | A2 | Ratio | Ratio Steps |
|---|---|---|---|---|---|---|---|---|
| 1VM3 |   | ● |   |   | ● | ● | 4.700 |   |
| 2VM3 | ● |   |   |   | ● | ● | 2.842 | 1.65 |
| 3VM3 |   |   | ● |   | ● | ● | 1.909 | 1.49 |
| 4VM3 |   |   |   | ● | ● | ● | 1.382 | 1.38 |
| 5VM3 | ● |   |   | ● |   | ● | 1.000 | 1.38 |
| 6VM3 |   | ● |   | ● |   | ● | 0.808 | 1.24 |
| 7VM3 |   | ● |   | ● |   | ● | 0.699 | 1.16 |
| 8VM3 |   | ● | ● |   |   |   | 0.580 | 1.21 |
| 9VM3 |   | ● | ● |   |   |   | 0.479 | 1.21 |
| RE |   |   | ● |   | ● |   | -3.805 | Spread : 9.81 |

Fig. 8

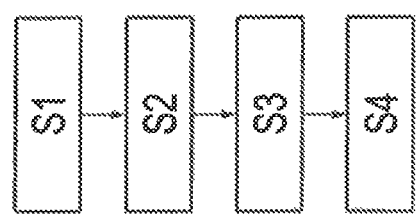

METHOD OF OPERATING A TRANSMISSION

FIELD OF THE INVENTION

The invention relates to a method for operating a transmission with a transmission input shaft, a transmission output shaft, a gear set and an electric motor, whereas, by means of shift elements, a plural number of gears is shiftable between the transmission input shaft and the transmission output shaft under load, and whereas, in one engaged gear, at least two of the shift elements are locked.

BACKGROUND

Here, a transmission designates, in particular, a multi-gear transmission with a predefined number of gears that provide fixed transmission ratio relationships between a transmission input shaft and a transmission output shaft, and is shiftable by means of shift elements. Here, the shift elements comprise clutches or brakes. Such transmissions are primarily used in motor vehicles, in order to adjust the drive unit's delivery capacity for rotational speed and turning moment to the driving resistance of the vehicle in a suitable manner.

A load-shiftable transmission with a transmission input shaft and a transmission output shaft and two power paths between the transmission input shaft and a main gear set, with two individual planetary gear sets with four shafts (designated, in the order of rotational speed, as the first, second, third and fourth shafts), is known from patent application DE 10 2012 201 377 A1 of the applicant, whereas an electric motor is connected to the first shaft of the main gear set.

However, the load-shiftable transmission known in the state of the art is not to be understood such that, starting from an arbitrary gear, a load-shifting process can take place in a different arbitrary gear. Rather, the shifting logic of the transmission is structured in such a manner that adjacent gears in particular can be shifted under load.

However, upon the use of the transmission in the motor vehicle, it is desirable to, starting from an engaged gear, carry out a shifting process under load, which goes beyond a gear adjacent to an engaged gear. For example, starting from a high gear, there can be a shift to a lower gear directly and under load, in order to improve the acceleration capacity of a motor vehicle with such a transmission.

SUMMARY OF THE INVENTION

As such, it is a task of the invention to provide a method for operating the transmission, by increasing the number of load-shiftable gear changes. Additional objects and advantages of the invention will be set forth in part in the following description, or may be obvious from the description, or may be learned through practice of the invention.

The tasks are solved by the characteristics of transmission operating methods set forth herein.

The transmission includes at least one transmission input shaft, one transmission output shaft, one gear set, and one electric motor with a rotor and a stator. Through the selective actuation of shift elements, a plural number of gears between the transmission input shaft and the transmission output shaft can be shifted under load. Such load-shifting processes can be effected upon both upshifts and downshifts in both load directions, thus upon drive upshifts, drive downshifts, coast upshifts and coast downshifts The gear set features at least two planetary gear sets, which include a plural number of shafts. Through the selective locking and keeping open of selected shift elements, and upon a corresponding allocation of the shift elements to the shafts of the gear set, a plural number of gears can be presented between the transmission input shaft and the transmission output shaft. Thereby, the shift elements are arranged in such a manner that, upon a shifting process between adjacent gears, at least one shift element always remains locked, and only one shift element must remain open and only one shift element must remain locked.

Upon a shifting process from one original gear to a target gear, in a first step, one of the shift elements located in the power flow of the transmission at this point in time is essentially set load-free by means of an electric motor. Thereby, with "essentially load-free," a state of the shift element, with which the opening of the shift element can take place without damage and a loss of comfort, is understood. In the load-free state, the shift element transfers no turning moment or a very low turning moment. Thereby, the electric motor acts on the shift element to be opened in such a manner that this is essentially load-free. Through an overlap of a torque acting on the transmission input shaft and the torque acting in a manner starting from the electric motor, with some shifting processes, the power flow between the transmission input shaft and the transmission output shaft can be maintained in such a manner, at least in part. Stated in other words, the transmission remains under load in such a manner.

If the shift element to be released is essentially set load-free, then it is opened in a second step. Thereby, the torque of the electric motor remains accordingly maintained, in order to retain the load-free state of the shift element while being opened.

After the opening of the shift element, the transmission ratio relationship between transmission input shaft and the transmission output shaft depends on the rotational speed of the rotor, since there is no longer a kinematic constraint. Instead of the open shift element, the electric motor then takes over that load that was previously transferred or supported by the shift element that is then open. Given the connection of the electric motor to the gear set, the amount of the load according to the transmission ratio relationships may be different. In a third step, a rotational speed synchronization between two shafts of the transmission is undertaken by means of the electric motor and/or by means of a torque at the transmission input shaft. The shafts to be synchronized are those shafts that are to be connected in the target gear through a shift element. Thereby, the torque applied by the electric motor is correspondingly adjusted. The rotational speed synchronization can be supported by the electric motor alone, or by the turning moment at the transmission input shaft, which is produced, for example, by an internal combustion engine in operative connection with the transmission input shaft or an additional electric motor. Moreover, a rotational speed synchronization solely through the torque acting on the transmission input shaft is possible.

A first shaft of the shafts that are synchronized in the third step is either connected to the transmission input shaft or features, at least during the shifting process, a fixed transmission ratio relationship on this, or is fixed in a torque-proof manner, or is a shaft of the gear set. A second shaft of the shafts that are synchronized in the third step is a shaft of the gear set. If the first shaft of the shafts that are synchronized in the third step is a shaft of the gear set, this comprises a shaft other than the second shaft of the shafts that are synchronized in the third step.

In a fourth step, after the successful synchronization of the shafts to be synchronized in the third step, the shift element to be locked in the target gear is locked. Through the locking of the shift element, a kinematic constraint of the gear set is produced. Subsequently, the turning moment of the electric motor can be reduced. Thus, the load-shifting process is complete.

The rotor of the electric motor is connected to the gear set through at least one auxiliary planetary gear set. Thereby, the auxiliary planetary gear set features a first, second and third shaft. The first shaft of the auxiliary planetary gear set is connected to the rotor. The second shaft of the auxiliary planetary gear set is connected to one shaft of the gear set. The third shaft of the auxiliary planetary gear set is connected to a different shaft of the gear set. Through this connection of the electric motor to the gear set, the result is that the electric motor can bring about a kinematic constraint of the gear set after the opening of the shift element upon each shifting process, depending on the type of shift, solely by specifying the rotational speed of the rotor or by specifying the rotational speed of the rotor in proportion to the rotational speed of the transmission input shaft. If the electric motor were directly connected to a gear set shaft, which is allocated to at least one shift element, and if this shift element were to remain locked upon the shifting process, after the opening of the shift element to be opened upon the shifting process, the gear set would be kinematically undetermined if the opened shift element was in the power flow of the transmission prior to the relevant shifting process. This would essentially have the consequence of a complete breakdown of the power flow from the transmission input shaft to the transmission output shaft.

Preferably, all shift elements are formed as black/white shift elements, which do not feature a continuously variable capability of transferring turning moment. In particular, all shift elements are formed as claw shift elements, which produce the connection through a positive-locking fit. This improves the mechanical degree of efficiency of the transmission, since, in the open state, such shift elements produce no drag losses or very low drag losses.

Preferably, the gear set features two planetary gear sets with a total of four shafts, known in the order of rotational speed as the first, second, third and fourth shafts. In such a case, the auxiliary planetary gear set is preferably connected to the gear set in such a manner that the first shaft of the gear set in the rotational speed map is between the first shaft of the auxiliary planetary gear set and the second shaft of the gear set. In doing so, the stationary transmission ratio of the auxiliary planetary gear set gear must be observed. Thereby, an enlarged transmission ratio of the rotor at the shafts of the gear set can be achieved, by which, with the same performance for the production of torque, the electric motor can be run less, and thus more easily and more cost-effectively.

According to a first embodiment, the second shaft of the auxiliary planetary gear set is connected to the first shaft of the gear set. In this case, the third shaft of the auxiliary planetary gear set is connected to the second, third or fourth shafts of the gear set.

According to a second embodiment, the second shaft of the auxiliary planetary gear set is connected to the second shaft of the gear set. In this case, the third shaft of the auxiliary planetary gear set is connected to the third or fourth shaft of the gear set.

According to a third embodiment, the second shaft of the auxiliary planetary gear set is connected to the third shaft of the gear set. In this case, the third shaft of the auxiliary planetary gear set is connected to the fourth shaft of the gear set.

Preferably, a sun gear of the auxiliary planetary gear set is a component of the first shaft of the auxiliary planetary gear set. In the event that the auxiliary planetary gear set is formed as a negative gear set, a bar of the auxiliary planetary gear set is a component of the second shaft of the auxiliary planetary gear set, and a ring gear of the auxiliary planetary gear set is a component of the third shaft of the auxiliary planetary gear set. If the auxiliary planetary gear set is formed as a positive gear set, the allocation of the ring gear and the bar is interchanged, such that the ring gear of the auxiliary planetary gear set is a component of the second shaft of the auxiliary planetary gear set and the bar of the auxiliary planetary gear set is a component of the third shaft of the auxiliary planetary gear set. Thus, the rotational speed of the second shaft of the auxiliary planetary gear set is always between the rotational speeds of the first and third shafts of the auxiliary planetary gear set, if the specified elements of the auxiliary planetary gear set do not rotate with the same rotational speed.

Alternatively, the auxiliary planetary gear set can also be connected to the gear set in such a manner that, in the rotational speed map, the fourth shaft of the gear set is between the third shaft of the gear set and the first shaft of the auxiliary planetary gear set.

According to an additional alternative, the auxiliary planetary gear set can also be connected to the gear set in such a manner that, in the rotational speed map, the first shaft of the auxiliary planetary gear set is between the first and fourth shafts of the gear set. Thereby, through the suitable selection of the stationary transmission ratios, it must be made sure that, in the rotational speed map, the location of the first shaft of the auxiliary gear set is not covered with the second and third shafts of the gear set.

Preferably, upon a shifting process from an original gear to the target gear, gears with the same or similar transmission ratios are taken into account. Gears with identical transmission ratios can arise, for example, if different combinations of locked and open shift elements lead to the same kinematic constraint, or if the kinematic constraint between the transmission input shaft and the transmission output shaft is already fixed through locking two shift elements, and a third element is locked, which has no effect on the constraint between the transmission input shaft and the transmission output shaft, since, for example, it is not in the power flow of the transmission. Gears with similar transmission ratios can arise if different combinations of locked and open elements produce different kinematic constraints of the planetary gear sets, but have a similar transmission ratio between the transmission input shaft and the transmission output shaft. In this connection, the transmission ratio between the gears is to be viewed as similar if the quotient of larger to smaller transmission ratios is less than 1.1, in particular preferentially less than 1.05. Such gears are typically not incorporated in the shifting logic. Instead, it is typical that only one of such gears is selected, regardless of the boundary conditions of component load, shifting logic, degree of efficiency or acoustics. With the inclusion of such gears in the shifting logic, the available number of load-shifting processes that go beyond the adjacent gear can be increased further.

The transmission may be a component of a hybrid drive train of a motor vehicle. The hybrid drive train features an internal combustion engine in addition to the transmission. The internal combustion engine is connected or connectable to the transmission input shaft of the transmission either directly or through a clutch or through a torque converter. Thereby, the motor vehicle can be driven by both the internal combustion engine and the electric motor of the transmission. Optionally, the transmission features an auxiliary electric motor, which is set up for the purpose of, through its rotor, delivering a turning moment at the transmission input shaft and, in such a manner, starting the internal combustion engine. This has the advantage that the internal combustion engine can be started with the assistance of the auxiliary electric motor, without having an effect on the simultaneous electric driving mode, in which the motor vehicle is driven solely by the electric motor of the transmission.

A shaft is not to be understood solely as, for example, a cylindrical, rotatably mounted machine element for the transfer of turning moments, but hereunder also as a general connection element that connects the individual components or elements to each other, in particular a connection element that connects several elements to each other in a torque-proof manner.

A planetary gear set includes a sun gear, a bar and a ring gear. Planetary gears, which mesh with the toothing of the sun gear and/or with the toothing of the ring gear, are rotatably mounted on the bar. In the following, a negative gear set describes a planetary gear set with a bar to which the planetary gears are rotatably mounted, with a sun gear and a ring gear, whereas the toothing of at least one of the planetary gears meshes with both the toothing of the sun gear and the toothing of the ring gear, by which the ring gear and the sun gear rotate in opposite directions if the sun gear is rotating with a fixed bar.

Both the sun gear and the ring gear of a planetary gear set can be divided into several segments. For example, it is conceivable that the planetary gears mesh with two sun gears, which are not connected to each other. Naturally, the rotational speed relationships are identical on both segments of the sun gear, as if they were connected to each other.

A positive gear set differs from the negative planetary gear set described above in that the positive gear set features inner and outer planetary gears, which are rotatably mounted at the bar. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear. This has the consequence that, with a fixed bar, the ring gear and the sun gear rotate in the same direction of rotation.

The stationary transmission ratio defines the rotational speed ratio between the sun gear and the ring gear of a planetary gear set with a torque-proof bar. Since, with a negative gear set, the direction of rotation between the sun gear and the ring gear with a torque-proof bar is reversed, the stationary transmission ratio with a negative gear set always takes a negative value.

In the rotational speed map, the rotational speed relationships of the individual shafts are plotted in a vertical direction. The horizontal gaps between the shafts arise from the transmission ratio relationships between the shafts, such that the rotational speed relationships and the turning moment relationships of the shafts pertaining to a certain operating point are connected by a straight line. The transmission ratio relationships between the shafts arise from the stationary transmission ratios of the participating planetary gear sets. The rotational speed map can be presented, for example, in the form of a Kutzbach map.

Four shafts, designated in the order of rotational speed as the first, second, third and fourth shafts, are characterized by the fact that the rotational speeds of such shafts, in the specified sequence, increase or decrease in a linear manner, or are the same. In other words, the rotational speed of the first shaft is less than or equal to the rotational speed of the second shaft. In turn, the rotational speed of the second shaft is less than or equal to the rotational speed of the third shaft. The rotational speed of the third shaft is less than or equal to the rotational speed of the fourth shaft. This sequence is also reversible, such that the fourth shaft features the smallest rotational speed, while the first shaft takes a rotational speed that is greater than or equal to the rotational speed of the fourth shaft. In doing so, there is always a linear relationship between the rotational speeds of all four shafts.

Thereby, the rotational speed of one or more shafts can also take negative values, or the value of zero. As such, the order of rotational speed always refers to the signed value of the rotational speed, and not to its amount.

An electric motor consists of at least one torque-proof stator and one rotatably mounted rotor, and is set up for the purpose of converting electrical energy into mechanical energy in the form of rotational speed and turning moment, and, in regenerative mode, converting mechanical energy into electrical energy in the form of current and voltage.

Through shift elements, depending on the operating state, a relative movement between two components is permitted, or a connection for transferring a turning moment between the two components is established. A relative movement is to be understood, for example, as a rotation of two components, whereas the rotational speed of the first component and the rotational speed of the second component differ. In addition, the rotation of only one of the two components is also conceivable, while the other component is at a standstill or is rotating in the opposite direction.

Two elements are designated as connected to each other in particular if a fixed (in particular, a torque-proof) connection exists between the elements. Such connected elements rotate with the same rotational speed, whereas a turning moment is transferable between the elements through the shift element. The various components and elements of the specified invention may be connected to each other through a shaft and/or through a locked shift element or a connection element, or also directly, for example by means of a welded connection, crimp connection or another connection.

Two elements are also designated as "connectable" if there is a detachable, torque-proof connection between such elements. If the connection exists, such elements rotate at the same rotational speed.

A two-bar/four-shaft transmission is to be understood as a planetary transmission that is formed from two individual planetary gear sets kinematically coupled to each other through exactly two coupling shafts and with which four of its elements ("shafts") are freely accessible for other transmission elements. Thereby, a coupling shaft is defined as a constant mechanical connection between one element—a sun gear or a bar or a ring gear—of the first individual planetary gear set with one element—a sun gear or a bar or a ring gear—of the second individual planetary gear set. The number of individual planetary gear sets and the number of free shafts are defined not by the visual appearance of the transmission, but by its kinematics. In each gear of a two bar/four shaft transmission, two of the shift elements of the transmission connected to elements of the two-bar/four-shaft transmission are locked. A rotational speed map of the transmission, for example the Kutzbach map known from transmission theory, is used for the graphic representation of the kinematics of the transmission. The so-called "Ravigneaux gear set" and the so-called "Simpson gear set" are known embodiments of such a two bar/four shaft transmission.

A reduced two bar/four shaft transmission is a structural shape of a two bar/four shaft transmission with which at least one element—a sun gear, a bar or a ring gear—of the transmission is spared, since another element of the transmission assumes its task without thereby changing the kinematics. The element that assumes the function of the spared element is, at the same time, one of the coupling shafts of the transmission. A known embodiment of this is the Ravigneaux gear set, which exhibits either two sun gears and only one ring gear, or two ring gears and only one sun gear, and has a common bar.

BRIEF DESCRIPTION OF THE DRAWINGS

Embodiments of the invention are described in detail below on the basis of the attached figures.

FIG. 3 shows a shifting diagram of the transmission in accordance with the first embodiment.

FIG. 5 shows an alternative shifting diagram of the transmission in accordance with the first embodiment.

FIG. 8 shows a shifting diagram of the transmission in accordance with the second embodiment.

FIG. 9 shows a process sequence for a shifting process.

DETAILED DESCRIPTION

Figure 1:
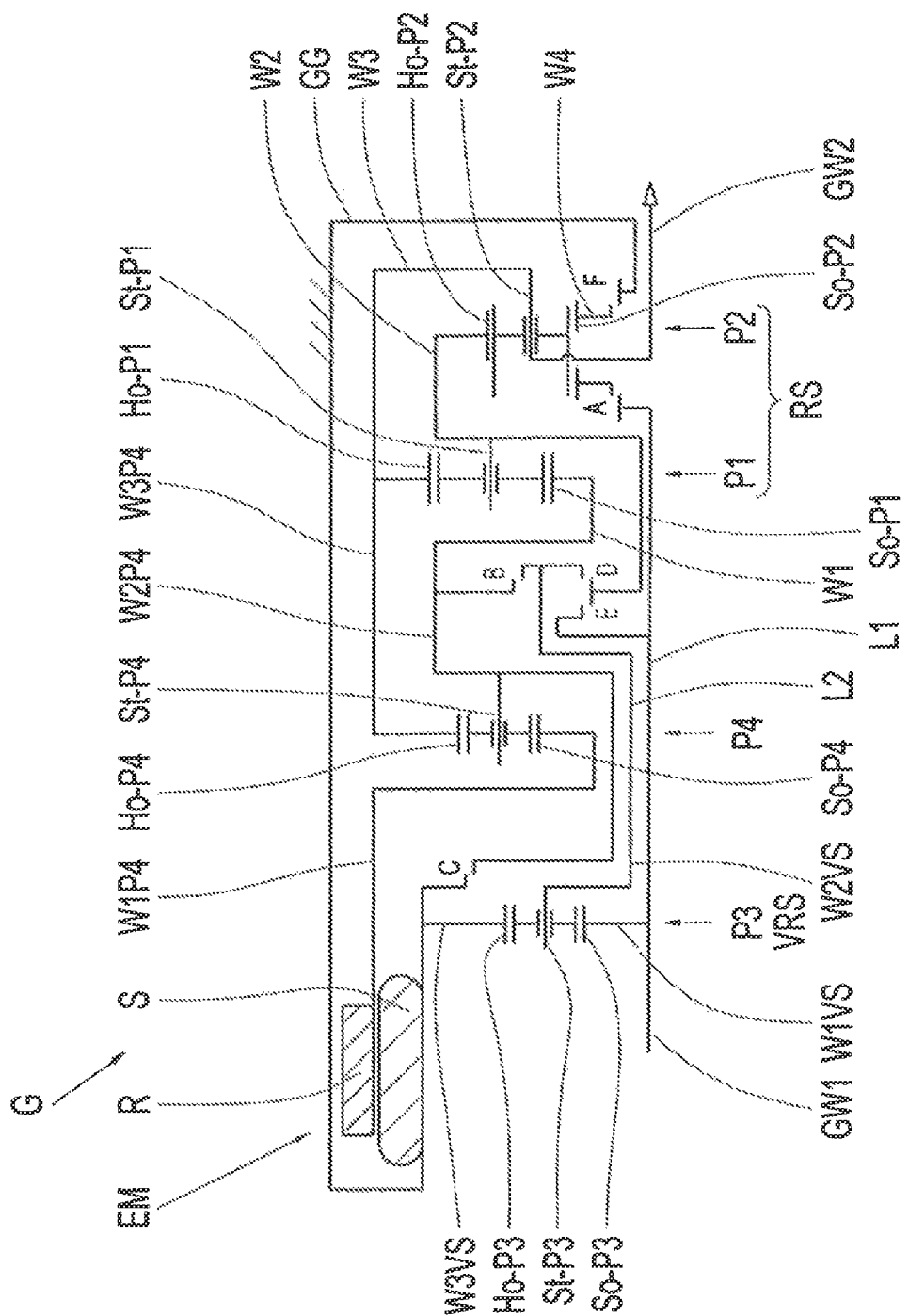
FIG. 1 schematically shows a transmission corresponding to an exemplary first embodiment of the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 schematically shows a transmission G corresponding to an exemplary embodiment of the invention. The transmission G features a transmission input shaft GW1, a transmission output shaft GW2, an upstream gear set VRS, an auxiliary planetary gear set P4 and a gear set RS. The upstream gear set VRS features a planetary gear set P3. The gear set RS features a first planetary gear set P1 and a second planetary gear set P2. All planetary gear sets P1, P2, P3, P4 are formed as negative gear sets.

The representation of the transmission essentially shows the connectable and connected elements of the transmission G. Through the gaps selected in the representation of the transmission, no conclusions can be drawn regarding the transmission ratio relationships.

The transmission input shaft GW1 is connected to a sun gear So-P3 of the planetary gear set P3 of the upstream gear set VRS. A ring gear Ho-P3 of the planetary gear set P3 of the upstream gear set VRS is connected in a torque-proof manner to the transmission housing GG of the transmission G, or to another torque-proof fixed structural element of the transmission G. In such a manner, a first and a second power path L1, L2 is formed, whereas power can be transferred from the transmission input shaft GW1 to the gear set RS through both the first power path L1 and the second power path L2. The second power path L2 thereby forwards a rotational speed to the gear set RS, which is changed compared to the rotational speed of the transmission input shaft GW1, by rendering the rotational speed of the transmission input shaft GW1 through the transmission ratio between the sun gear So-P3 and a bar St-P3 of the planetary gear set P3 of the upstream gear set VRS. The first power path L1 forwards the rotational speed of the transmission input shaft GW1, without a transmission ratio, to the gear set RS. Thereby, the sun gear So-P3 of the planetary gear set P3 of the upstream gear set VRS is a component of a first shaft W1VS of the upstream gear set VRS, which is connected to the transmission input shaft GW1. The bar St-P3 of the planetary gear set P3 of the upstream gear set VRS is a component of a second shaft W2VS of the upstream gear set VRS. The component at which the ring gear Ho-P3 of the planetary gear set P3 of the upstream gear set VRS is supported is designated below as the third shaft W3VS of the upstream gear set VRS.

A first shaft W1 of the gear set RS is connected to a sun gear So-P1 of the first planetary gear set P1 of the gear set RS. A second shaft W2 of the gear set RS is connected to a bar St-P1 of the first planetary gear set P1 and a ring gear Ho-P2 of the second planetary gear set P2 of the gear set RS. A third shaft W3 of the gear set RS is connected to a ring gear Ho-P1 of the first planetary gear set P1 and a bar St-P2 of the second planetary gear set P2 of the gear set RS. A fourth shaft W4 of the gear set RS is connected to a sun gear So-P2 of the second planetary gear set P2 of the gear set RS. Through this connection between the individual structural elements of the first and second planetary gear sets P1, P2 of the gear set RS, the arrangement of the first, second, third and fourth shafts W1, W2, W3, W4 of the gear set RS is determined in the rotational speed map, whereas the sequence of first, second, third, fourth shaft W1, W2, W3, W4 corresponds to its sequence in the rotational speed map. The third shaft W3 of the gear set RS is connected to the transmission output shaft GW2. Alternatively, the third shaft W3 of the gear set RS is also connected to the transmission output shaft GW2 through an additional transmission ratio gear. The sun gear So-P2 of the second planetary gear set P2 of the gear set RS features two parts that are separated from each other. This enables the connection of the transmission output shaft GW2 with the third shaft W3 of the gear set RS, which is arranged between the two parts of the sun gear So-P2. Naturally, the rotational speed relationships are equal on both parts of the sun gear So-P2. As a result, both parts of the sun gear So-P2 are designated below as components of the same shaft, specifically the fourth shaft W4 of the gear set RS.

The first power path L1 is connectable through a shift element A to the fourth shaft W4 of the gear set RS and through a shift element E to the second shaft W2 of the gear set RS. The second power path L2 is connectable through a shift element B to the first shaft W1 of the gear set RS and through a shift element D to the second shaft W2 of the gear set RS. The first shaft W1 of the gear set RS is connectable through a shift element C to the transmission housing GG of the transmission G, or to another torque-proof structural element of the transmission G, such that, with a locked shift element C, the first shaft W1 of the gear set RS cannot take any rotational speed. In the same manner, the fourth shaft W4 of the gear set RS is able to be fixed in a torque-proof manner through a shift element F, by connecting the fourth shaft W4 through the shift element F with the transmission housing GG.

The transmission G features an electric motor EM, whereas a stator S of the electric motor EM is connected in a torque-proof manner to the transmission housing GG of the transmission G or to another torque-proof structural element of the transmission G, such that the stator S cannot take any rotational speed. A rotatably mounted rotor R of the electric motor EM is connected to a sun gear So-P4 of the auxiliary planetary gear set P4. The sun gear So-P4 of the auxiliary planetary gear set P4 is a component of a first shaft W1P4 of the auxiliary planetary gear set P4. A bar St-P4 of the auxiliary planetary gear set P4 is a component of a second shaft W2P4 of the auxiliary planetary gear set P4, and is connected to the first shaft W1 of the gear set RS. A ring gear Ho-P4 of the auxiliary planetary gear set P4 is a component of a third shaft W3P4 of the auxiliary planetary gear set P4, and is connected to the third shaft W3 of the gear set RS.

Figure 2:
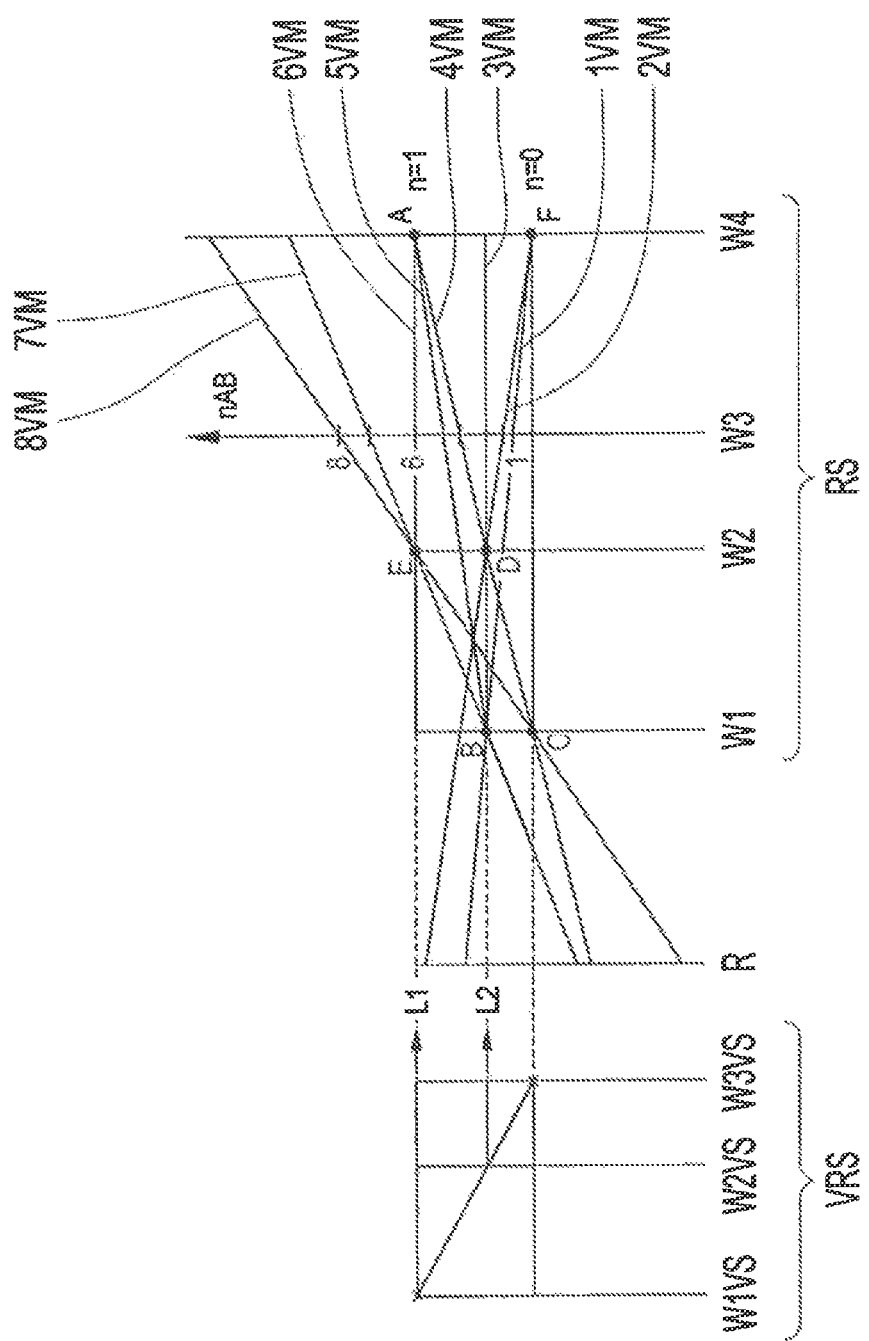
FIG. 2 shows a rotational speed map of the transmission in accordance with the first embodiment.

FIG. 2 shows a rotational speed map of the exemplary embodiment of the transmission G, while FIG. 3 presents a shifting diagram of the exemplary embodiment of the transmission G. In FIG. 2, the rotational speeds of the four shafts W1, W2, W3, W4 of the gear set RS and of the rotor R are plotted in a vertical direction, in proportion to the rotational speed of the transmission input shaft GW1. The maximum rotational speed of the transmission input shaft GW1 that arises is standardized to the value of one. The gaps between the four shafts W1, W2, W3, W4 of the gear set RS and the rotor R arise from the stationary transmission ratios of first and second planetary gear sets P1, P2 of the gear set RS and the stationary transmission ratio of the auxiliary planetary gear set P4, whereas the presentation only serves the purpose of illustration and is not to scale. The rotational speed relationships pertaining to a certain operating point are connected by a straight line.

If two shafts are connected together, these interconnected shafts turn at same rotational speed. For reasons of clarity, such connected shafts can be represented as horizontally separated from each other in the rotational speed map, for example, in order to better clarify the transfer of the rotational speed from the upstream gear set VRS through the first or second power path L1, L2 to the gear set RS. Thereby, the horizontal gap between the shafts connected in such a manner, which is selected in the rotational speed plan, is arbitrary. Naturally, the transmission ratio between such connected shafts amounts to the value of one, regardless of the horizontal gap selected in the rotational speed map.

If the ring gears, bars and suns of the planetary gear sets of two such elements are connected to each other, the ring gears, bars and suns of such planetary gear sets rotate with the same rotational speed. In this state, the transmission ratio between the specified elements takes the value of one. For reasons of clarity, the horizontal arrangement of the shafts connected to such elements in the rotational speed map is not shifted. As a result, this state in the rotational speed map can be recognized by a horizontal straight line, which connects the participating shafts to each other.

Through the shifting diagram in FIG. 3 and the rotational speed map in FIG. 2, the functioning of the transmission G is clear. In FIG. 3, the locked shift elements A, B, C, D, E, F are indicated by circles. As an example, the respective transmission ratios of the individual gears and the gear steps to be determined by them to the next higher gear can be seen in the shifting diagram, whereas, in such a manner, the transmission G features a spread of 10.1. The transmission ratios arise from the stationary transmission ratios of the planetary gear sets P1, P2, P3, and P4. Upon a sequential shifting operation, double gearshifts or group gearshifts can be avoided, since two adjacent gears together use one shift element. The gears of the transmission G are presented in the various lines of the shifting diagram.

A first forward gear 1VM between the transmission input shaft GW1 and the transmission output shaft GW2 arises through the locking of the shift element B and the shift element F, a second forward gear 2VM arises through the locking of the shift element D and the shift element F, a third forward gear 3VM arises through the locking of the shift element B and the shift element D, a fourth forward gear 4VM arises through the locking of the shift element D and the shift element A, a fifth forward gear 5VM arises through the locking of the shift element B and the shift element A, a sixth forward gear 6VM arises through the locking of the shift element E and the shift element A, a seventh forward gear 7VM arises through the locking of the shift element B and the shift element E, and an eighth forward gear 8VM arises through the locking of the shift element C and the shift element E.

The following describes an example of a load-shifting process. In the second forward gear 2VM, the shift elements D and F are locked. Each of the second and the fourth shafts W2, W4 of the gear set RS forms a differential shaft, while the third shaft W3 of the gear set RS represents a sum shaft. If the electric motor EM does not deliver a torque, or does not accept a torque, the auxiliary planetary gear set P4 and the first planetary gear set P1 of the gear set RS in the second forward gear 2VM are not in the power flow of the transmission G. Upon a shifting process of the second forward gear 2VM to the third forward gear 3VM, the shift element D remains locked. The shift element F is opened; subsequently, the shift element B is locked. Since the shift element F is formed as a claw shift element, the shift element F must be essentially set load-free prior to opening, such that the shift element F transfers no turning moment or a very low turning moment. Such release of the load of the shift element F is brought about by a regenerative torque of the electric motor EM. Through the overlap of the torque starting from the transmission input shaft GW1 and the torque starting from the electric motor EM, the torque transferred by the shift element F is essentially reduced to zero. Thereby, at least one part of turning moment previously applied at the third shaft W3 of the gear set RS is retained, by which a complete breakdown of the turning moment does not arise at the transmission output shaft GW2. If the shift element F is open, the second shaft W2 of the gear set RS is the sum shaft, while each of the first shaft W1P4 of the auxiliary planetary gear set P4 and the third shaft W3 of the gear set RS forms a differential shaft. At least through the electric motor EM, a regenerative turning moment is then applied, in order to achieve a rotational speed synchronization of the second shaft W2VS of the upstream gear set VRS and the first shaft W1 of the gear set RS. The rotational speed synchronization can be supported by a turning moment at the transmission input shaft GW1, which is produced, for example, by an internal combustion engine VKM that is in operative connection with the transmission input shaft GW1. The synchronization may also take place only through one torque acting on the transmission input shaft GW1. This enables the locking of the shift element B, whereas at least one part of the turning moment previously applied at the third shaft W3 of the gear set RS is retained. If the shift element B is locked, the first shaft W1 of the gear set RS is a differential shaft; the shifting process is thus concluded.

With this exemplary transmission, such load-shifting processes can be undertaken both between adjacent forward gears and between the eighth and the sixth forward gears 8VM-6VM, between the seventh and the fifth forward gears 7VM-5VM, between the seventh and the third forward gears 7VM3VM, between the seventh and the first forward gears 7VM-1VM, between the sixth and the fourth forward gears 6VM-4VM, between the fifth and the third forward gears 5VM-3VM, between the fifth and the first forward gears 5VM-1VM, between the fourth and the second forward gears 4VM2VM, and between the third and the first forward gears 3VM-1VM.

Figure 4:
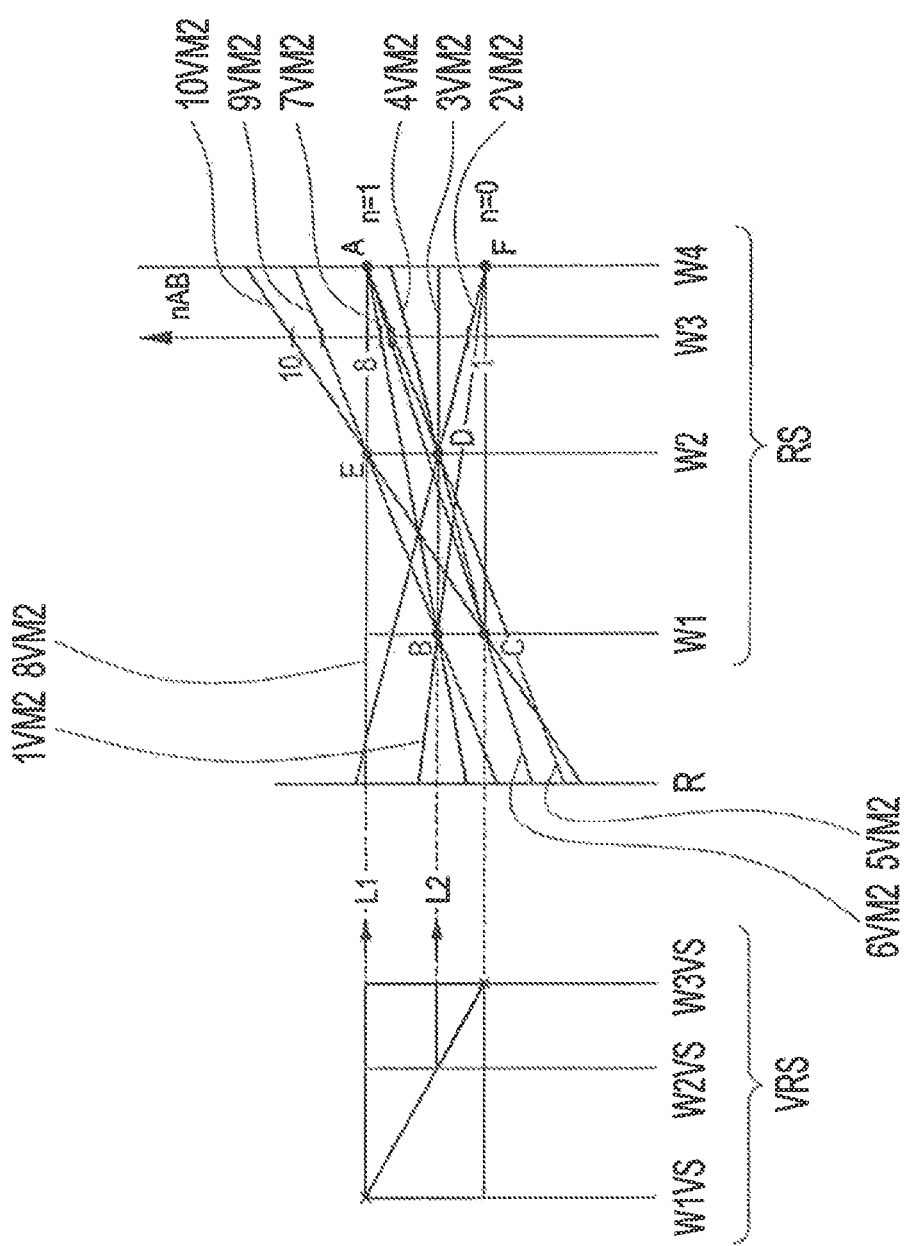
FIG. 4 shows an alternative rotational speed map of the transmission in accordance with the first embodiment.

FIG. 4 shows an alternative rotational speed map of the transmission G according to the first embodiment, whereas the stationary transmission ratio of the second planetary gear set P2 has been slightly reduced. In contrast to the rotational speed map in FIG. 2, the transmission G features ten forward gears 1VM2-10VM2. A first forward gear 1VM2 between the transmission input shaft GW1 and the transmission output shaft GW2 arises through the locking of the shift element B and the shift element F, a second forward gear 2VM2 arises through the locking of the shift element D and the shift element F, a third forward gear 3VM2 arises through the locking of the shift element B and the shift element D, a fourth forward gear 4VM2 arises through the locking of the shift element C and the shift element D, a fifth forward gear 5VM2 arises through the locking of the shift element D and the shift element A, a sixth forward gear 6VM2 arises through the locking of the shift element C and the shift element A, a seventh forward gear 7VM2 arises through the locking of the shift element B and the shift element A, an eighth forward gear 8VM2 arises through the locking of the shift element E and the shift element A, a ninth forward gear 9VM2 arises through the locking of the shift element B and the shift element E and a tenth forward gear 10VM2 arises through the locking of the shift element C and the shift element E.

In FIG. 4, it can clearly be seen that the gear gradation of the ten forward gears 1VM2-10VM2 is not harmonious. In particular, the difference in transmission ratios between the fourth and sixth forward gears 4VM2-6VM2 is low compared to the remaining gears. FIG. 5 shows the shifting diagram for the rotational speed map shown in FIG. 4, whereas the transmission ratios and the transmission ratio jump between the gears are presented. The gears 4VM2, 5VM2 and 6VM2 are gears with similar transmission ratios.

With an exemplary stationary transmission ratio of the third planetary gear set P3 of negative 1.55 and an exemplary stationary transmission ratio of the first planetary gear set P1 of negative 1.80 and of the second planetary gear set P2 of negative 1.60, additional load shifts from the tenth forward gear 10VM2 to the fourth forward gear 4VM2 or to the sixth forward gear 6VM2, from the sixth forward gear 6VM2 to the fourth forward gear 4VM2, from the fourth forward gear 4VM2 to the second forward 2VM gear, and vice versa, are thus possible. All adjacent gears, including the newly added forward gears, are likewise load-shiftable.

Figure 6:
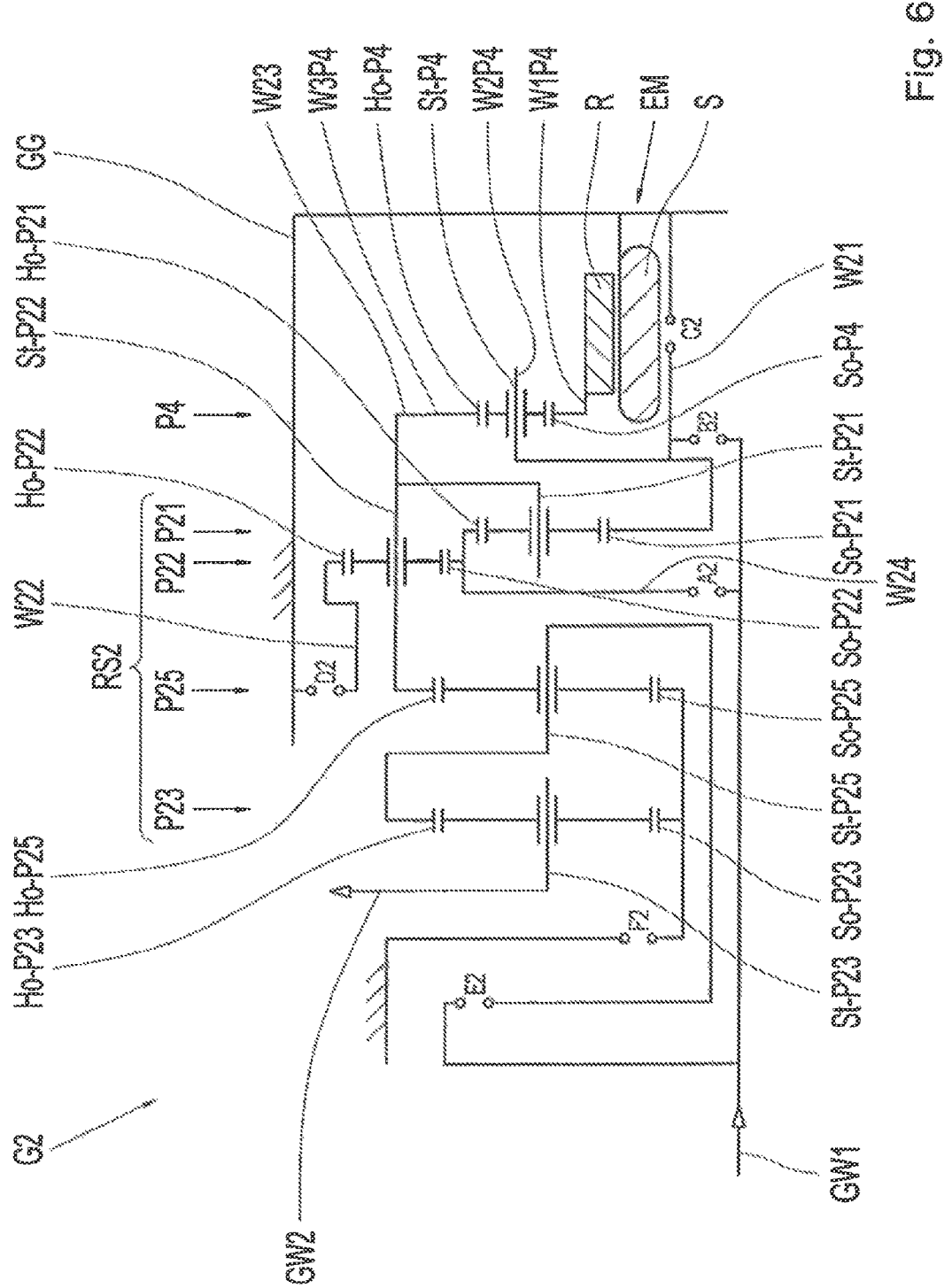
FIG. 6 schematically shows a transmission corresponding to an exemplary second embodiment of the invention.

FIG. 6 schematically shows a transmission G2 in accordance with an exemplary second embodiment of the invention. The gear set RS2 of this second embodiment features a different structure than the gear set RS of the first embodiment. The gear set RS2 features a first, second, third and fourth planetary gear set P21, P22, P23, P25. The first and second planetary gear sets P21, P22 together feature four shafts W21, W22, W23, W24 arranged in the order of rotational speed. A sun gear So-P21 of the first planetary gear set P21 is a component of the first shaft W21. A ring gear Ho-P22 of the second planetary gear set P22 is a component of the second shaft W22. A bar St-P21 of the first planetary gear set P21 and a bar St-P22 of the second planetary gear set P22 are connected to each other and, in such a manner, form the third shaft W23. A ring gear Ho-P21 of the first planetary gear set P21 and a sun gear So-P22 of the second planetary gear set P22 are connected to each other and, in such a manner, form the fourth shaft W24. This embodiment of the gear set RS2 is to be regarded solely as an example. Alternative embodiments for such a two bar/four shaft transmission, which could likewise be used if there is suitable accessibility, are known to the specialist.

The rotor R of the electric motor EM is connected to the sun gear So-P4 of the auxiliary planetary gear set P4, whereas the sun gear So-P4 is a component of the first shaft W1P4 of the auxiliary planetary gear set P4. The bar St-P4 of the auxiliary planetary gear set P4 is a component of the second shaft W2P4 of the auxiliary planetary gear P4, and is connected to the first shaft W21 of the gear set RS2. The ring gear Ho-P4 of the auxiliary planetary gear set P4 is a component of the third shaft W3P4 of the auxiliary planetary gear set P4, and is connected to the third shaft W23 of the gear set RS2.

Six shift elements, A2, B2, C2, D2, E2, F2, all of which are formed as claw shift elements, are allocated to the gear set RS2. Through the shift element A2, a torque-proof connection between the transmission input shaft GW1 and the fourth shaft W24 of the gear set RS2 can be produced. Through the shift element B2, a torque-proof connection between the transmission input shaft GW1 and the first shaft W21 of the gear set RS2 can be produced. Through the shift element C2, the first shaft W21 of the gear set RS2 can be fixed in a torque-proof manner, by connecting the first shaft W21 through the shift element C2 to the housing GG of the transmission G2 or a different torque-proof structural element of the transmission G2. In the same manner, the second shaft W22 of the gear set RS2 can be fixed in a torque-proof manner by the shift element D2.

A sun gear So-P23 of the third planetary gear set P23 and a sun gear So-P25 of the fourth planetary gear set P25 are connected to each other, and can be fixed in a torque-proof manner through the shift element F2. A bar St-P23 of the third planetary gear set P23 is connected to the transmission output shaft GW2. A ring gear Ho-P23 of the third planetary gear set P23 and a bar St-P25 of the fourth planetary gear set P25 are connected to each other, and are connectable with the transmission input shaft GW1 through the shift element E2. Just like the shift element F2, the shift element E2 is formed as a claw shift element. A ring gear Ho-P25 of the fourth planetary gear set P25 is constantly connected to the third shaft W23 of the gear set RS2.

Figure 7:
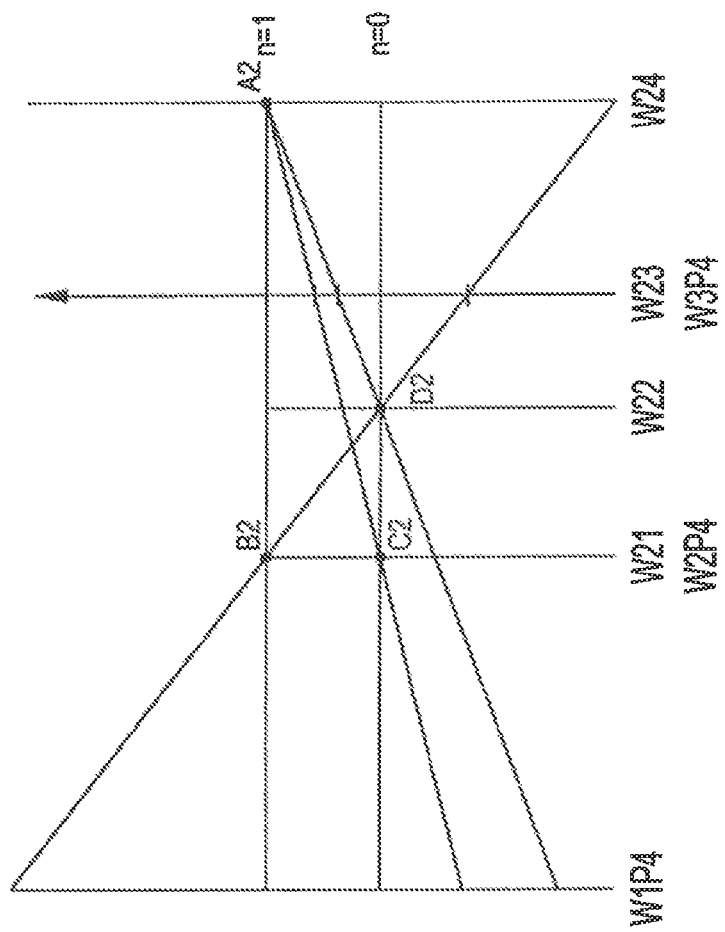
FIG. 7 shows a rotational speed map of the first and second planetary gear sets in accordance with the second embodiment.

FIG. 7 shows a rotational speed map of the first and second planetary gear sets P21, P22 of the gear set RS2 in accordance with the second embodiment, while FIG. 8 shows a shifting diagram of the transmission G2 in accordance with the second embodiment. In FIG. 7, the rotational speeds of the four shafts W21, W22, W23, W24 of the gear set RS2 and the three shafts W1P4, W2P4, W3P4 of the auxiliary planetary gear set P4 are plotted in a vertical direction, in proportion to the rotational speed of the transmission input shaft GW1.

Through the shifting diagram in FIG. 8, the functioning of the second embodiment of the transmission G2 is clear. The locked shift elements A2, B2, C2, D2, E2, F2 are indicated by circles. As an example, the respective transmission ratios of the individual gears and the gear steps to be determined by them at the next higher gear can be seen in the shifting diagram, whereas, in such a manner, the transmission G2 features a spread of 9.81. The transmission ratios arise from the stationary transmission ratios of the planetary gear sets P21, P22, P23, P4 and P25. The forward gears 1VM3-9VM3 and the reverse gear RE of the transmission G2 are presented in the various lines of the shifting diagram.

In such a manner, with the present exemplary transmission G2, a load-shifting process can be undertaken, apart from that between the gears adjacent to each other, also between the first forward gear 1VM3 and the third forward gear 3VM3, between the second forward gear 2VM3 and fourth forward gear 4VM3, between the fifth forward gear 5VM3 and seventh forward gear 7VM3, between the sixth forward gear 6VM3 and eighth forward gear 8VM3, between the ninth forward gear 9VM3 and the fifth forward gear 5VM3, between the seventh forward gear 7VM3 and the fourth forward gear 4VM3, between the fourth forward gear 4VM3 and the first forward gear 1VM3, between the sixth forward gear 6VM3 and the fourth forward gear 4VM3, between the seventh forward gear 7VM3 and ninth forward gear 9VM3, and vice versa.

FIG. 9 shows a process sequence for a shifting process of the transmission. In a first step S1, one of the shift elements A-F, A2-F2 is set largely load-free by means of the electric motor EM. In a second step S2, the shift element that is set largely load-free in the first step S1 is opened. In a third step S3, a rotational speed synchronization is undertaken between these shafts of the transmission that are to be connected in the target gear through a shift element. In a fourth step S4, the shift element to be locked for reaching the target gear is locked.

Modifications and variations can be made to the embodiments illustrated or described herein without departing from the scope and spirit of the invention as set forth in the appended claims.

REFERENCE SIGNS

G/G2 Transmission
GW 1 Transmission input shaft
GW2 Transmission output shaft
RS/RS2 Gear set
VRS Upstream gear set
EM Electric motor
R Rotor of the electric motor
S Stator of the electric motor
P1/P21 First planetary gear set of the gear set
P2/P22 Second planetary gear set of the gear set
P23 Third planetary gear set of the gear set
P25 Fourth planetary gear set of the gear set
P3 Planetary gear set of the upstream gear set
P4 Auxiliary planetary gear set
W1/W21 First shaft of the gear set
W2/W22 Second shaft of the gear set
W3/W23 Third shaft of the gear set
W4/W24 Fourth shaft of the gear set
W 1 VS First shaft of the upstream gear set
W2VS Second shaft of the upstream gear set
W3VS Third shaft of the upstream gear set
W1 P4 First shaft of the auxiliary planetary gear set
W2P4 Second shaft of the auxiliary planetary gear set
W3P4 Third shaft of the auxiliary planetary gear set
A/A2 Shift element
E/E2 Shift element
B/B2 Shift element
D/D2 Shift element
C/C2 Shift element
F/F2 Shift element
So-P1/21 Sun gear of the first planetary gear set
St-P1/21 Bar of the first planetary gear set
Ho-P1/21 Ring gear of the first planetary gear set
So-P2/22 Sun gear of the second planetary gear set
St-P2/22 Bar of the second planetary gear set
Ho-P2/22 Ring gear of the second planetary gear set
So-P3 Sun gear of the planetary gear set of the upstream gear set
St-P3 Bar of the planetary gear set of the upstream gear set
Ho-P3 Ring gear of the planetary gear set of the upstream gear set
So-P23 Sun gear of the third planetary gear set
St-P23 Bar of the third planetary gear set
Ho-P23 Ring gear of the third planetary gear set
So-P25 Sun gear of the fourth planetary gear set
St-P25 Bar of the fourth planetary gear set
Ho-P25 Ring gear of the fourth planetary gear set
So-P4 Sun gear of the auxiliary planetary gear set
St-P4 Bar of the auxiliary planetary gear set
Ho-P4 Ring gear of the auxiliary planetary gear set
L1 First power path
L2 Second power path
1VM-8VM First to eighth forward gears
1VM2-10VM2 First to tenth forward gears
1VM3-9VM3 First to ninth forward gears
RE Reverse gear
GG Transmission housing
S1 First step
S2 Second step
S3 Third step
S4 Fourth step

The invention claimed is:
1. A method for operating a transmission (G, G2), wherein the transmission comprises:
    a transmission input shaft (GW1);
    a transmission output shaft (GW2);
    a plurality of additional shafts;
    a gear set (RS, RS2) with at least two planetary gear sets (P1, P2; P21, P22, P23, P25) and four shafts (W1-W4; W21-W24) of the plurality of additional shafts, each planetary gear set having two different shafts of the four shafts (W1-W4; W21-W24);
    an electric motor (EM) with a rotor (R) and a stator (S); and
    a plurality of shift elements (A-F, A2-F2) by which a plural number of gears is shiftable between the transmission input shaft (GW1) and the transmission output shaft (GW2) under load, whereas, in one engaged gear, at least two of the shift elements (A-F, A2-F2) are locked;
the method comprising a shifting process of the transmission (G, G2) from one original gear to a target gear at a point in time wherein:
    (a) in a first step (S1), one of the shift elements (A-F, A2-F2) located in a power flow of the transmission (G, G2) is set essentially load-free by use of the electric motor (EM);
    (b) in a second step (S2), the shift element set essentially load-free in the first step (S1) is opened;
    (c) in a third step (S3), a rotational speed synchronization between two shafts of the transmission (G, G2) is undertaken by means of the electric motor (EM) or by means of a torque at the transmission input shaft (GW1), the two shafts which are to be connected in the target gear through a shift element that was not in the power flow of the transmission (G, G2) at the first step (S1); and (d) in a fourth step (S4), the shift element between the two shafts synchronized in the third step (S3) is locked;

and further wherein:

a first shaft of the two shafts synchronized in the third step (S3) is connected to the transmission input shaft (GW1) by one of: a fixed transmission ratio relationship on the transmission input shaft (GW1); is fixed in a torque-proof manner; or is one of the four shafts (W1-W4; W21-W24) of the gear set (RS, RS2);

a second shaft of the two shafts synchronized in the third step (S3) is another one of the four shafts (W1-W4; W21-W24) of the gear set (RS, RS2);

the electric motor is connected to the gear set (RS, RS2) through at least one auxiliary planetary gear set (P4) having a first, second and third auxiliary shaft (W1P4, W2P4, W3P4), the first auxiliary shaft (W1P4) of the auxiliary planetary gear set (P4) is directly and non-detachably connected to the rotor (R), and the second auxiliary shaft (W2P4) and the third auxiliary shaft (W3P4) of the auxiliary planetary gear set (P4) are each connected to a different shaft of the four shafts of the gear set (RS, RS2); and a change to a transmission ratio between the transmission input shaft (GW1) and the transmission output shaft (GW2) from the original gear to the target gear is greater than a change to the transmission ratio between the original gear and a gear numerically adjacent to the original gear.

2. The method for operating the transmission (G, G2) according to claim 1, wherein the shift elements (A-F, A2-F2) do not feature a continuously variable torque transfer capacity.

3. The method for operating the transmission (G, G2) according to claim 2, wherein the shift elements (A-F, A2-F2) are formed as claw shift elements.

4. The method for operating the transmission (G, G2) according to claim 1, wherein the four shafts (W1-W4; W21-W24) of the gear set (RS, RS2) are designated in an order of rotational speed as first, second, third and fourth shafts.

* * * * *